J. ROBSON.
FOUR HORSE EQUALIZER.
APPLICATION FILED MAY 20, 1921.

1,423,682.

Patented July 25, 1922.

INVENTOR
J. Robson
BY
ATTORNEYS

UNITED STATES PATENT OFFICE.

JOHN ROBSON, OF ANITA, IOWA.

FOUR-HORSE EQUALIZER.

1,423,682.  Specification of Letters Patent.  Patented July 25, 1922.

Application filed May 20, 1921. Serial No. 471,039.

*To all whom it may concern:*

Be it known that I, JOHN ROBSON, a citizen of the United States, and a resident of Anita, in the county of Cass and State of Iowa, have invented a new and useful Improvement in Four-Horse Equalizers, of which the following is a full, clear, and exact description.

My invention relates to draft-equalizing devices for agricultural implements, and it consists in the combinations, constructions, and arrangements herein described and claimed.

An object of my invention is to provide a draft-equalizing device or evener for four draft animals, whereby sufficient space is at all times afforded for free movement of each draft animal without interfering with the movements of the remaining draft animals.

A further object of my invention is to provide a device that is adapted for application to an agricultural implement, such as a gang or sulky plow, whereby draft animals may be hitched to the implement in close juxtaposition thereto and the stress on the draft animals thus reduced to a minimum.

A further object of my invention is to provide a device of the character described that is adapted to be attached to an agricultural implement, such as a plow, to occasion a substantially even stress on all the animals hitched thereto when the implement is being turned at an angle to the direction previously traversed, as for instance, when turning a corner.

A further object of my invention is to provide a device of the character described that can be quickly and easily applied to various agricultural implements, such as gang and sulky plows, harvesting machines, etc., without any change being required in the usual construction of the implement.

Other objects and advantages will appear in the following specification, and the novel features of the invention will be particularly pointed out in the appended claims.

My invention is illustrated in the accompanying drawings, forming part of this application, in which—

Figure 1:
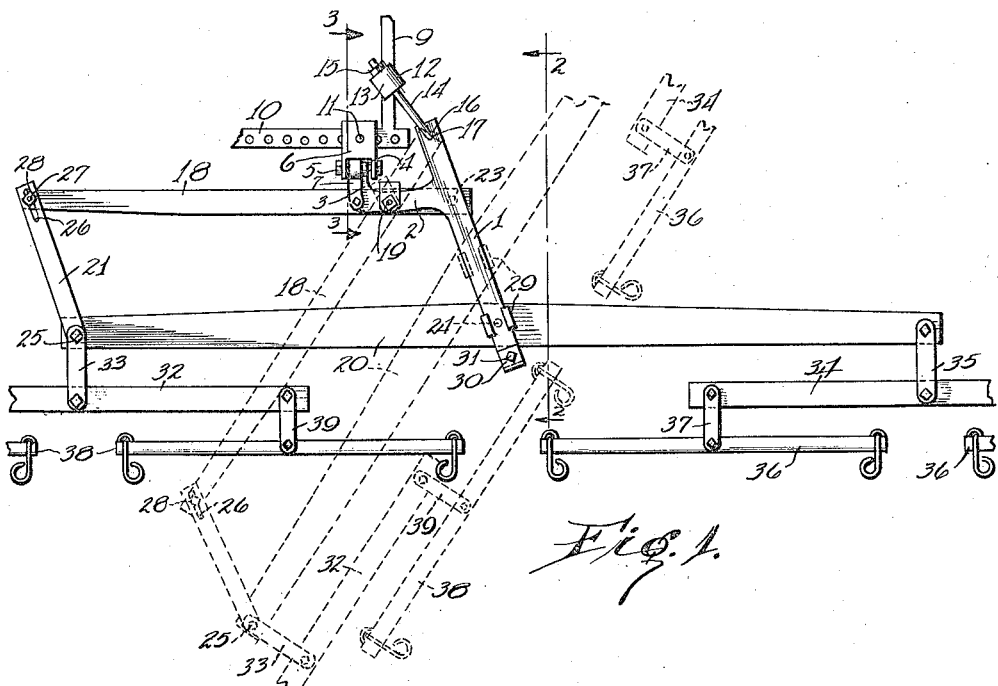
Figure 1 is a plan view, showing the device applied to an implement tongue.
Figure 2:
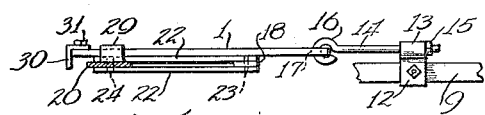
Figure 2 is a section along the line 2—2 of Figure 1.
Figure 3:
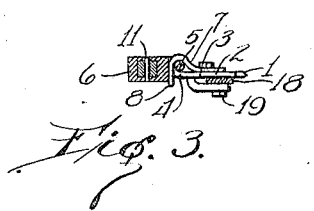
Figure 3 is a section along the line 3—3 of Figure 1.

In carrying out my invention, I provide a draft bar consisting of a substantially straight body portion 1 and an integral extension 2 thereto. The extension 2 extends at an acute angle to the rearward extremity of the body portion 1 and is turned laterally at 3 adjacent to its end, being fashioned to provide an eyelet 4 at its end. A bolt 5 is projected through the lugs of a clevis 6 and the eyelet 4 to secure the clevis to the draft bar. A reenforcing and supporting strap 7 is secured at one end to the extension 2 and superposed on the laterally turned end portion thereof, being bent downwardly around the eyelet 4, as at 8. The downwardly turned portion 8 contacts the adjacent wall of the clevis 6 and maintains the draft bar and the parts carried thereby in substantially the same horizontal plane as an implement tongue 9 to which the draft bar is attached. The clevis 6 is secured to a clevis-engaging portion 10 of the tongue 9 by means of a bolt or pin 11 or in any other suitable manner.

A clamping member 12 is disposed on the tongue 9 at a spaced distance from the clevis-engaging member 10 and is formed with an eyelet 13 adapted to slidably receive a rod 14. A nut 15 is threaded on the rod 14 at its rearward end to prevent the displacement of the rod which is formed at its other end to provide a hook 16 adapted to engage an opening 17 through the draft bar.

A draft-equalizing frame comprises a bar 18 pivoted at 19 to the extension 2 intermediate the length of the latter and at a spaced distance from one end of the bar 18. A bar 20 that has a length approximately twice that of the bar 18 is disposed substantially parallel with the latter and is connected therewith by connectors 21 and 22. The connector 22 is pivoted at 23 to the bar 18 and at 24 to the bar 20 approximately midway between the ends of the latter. The connector 21 is pivoted at 25 to the bar 20 at one end of the latter and is provided with a guide slot 26 adapted to receive a pin 27 projected through the corresponding end of the bar 18. A nut 28 threaded on the pin 27, which may be a bolt, prevents displacement of the bar 21 with respect to the bar 18 while permitting slidable movement of the pin 27 along the guide slot 26.

The bolt 24 that secures the connectors 22 to the bar 20 also pivotally connects a clip 29 with the latter. The clip 29 slidably engages the body portion 1 of the draft bar.

A retaining member 30 is secured by a bolt 31 or the like to the body portion 1 of the draft bar and is turned downwardly to prevent the withdrawal of the body portion 1 through the guiding and retaining clip 29.

From the foregoing description of the various parts of the device, the operation thereof may be readily understood. A double-tree 32 is secured by a link or clevis 33 to the bar 20 at one end of the latter. A similar double-tree 34 is secured by a link 35 to the bar 20 at its other end. A pair of whiffle-trees 36—36 are secured to the double-tree 34 at opposite ends of the latter and in any suitable manner, as by means of links 37. A second pair of whiffle-trees 38—38 are secured to the double-tree 32 at opposite ends thereof as at 39. A draft animal may be hitched to each of the whiffle-trees in the usual manner to accomplish the drawing of the implement of which the tongue 9 is a part. Obviously, the draft animals hitched to the double-tree 34 will be balanced against the draft animals hitched to the double-tree 32. The draft animals are thus so disposed that each one has space for free movement without impeding the progress of an adjacent draft animal, wherefore each draft animal pulls directly in the line of progress and a maximum of work may be performed with a minimum of strain on the draft animals. The device is particularly adapted for application to plows and may be used to decided advantage, since the implement to which attached may be turned at a right angle to the direction previously traversed, as in turning a corner, and during the turning movement, the draft will be distributed equally among all the draft animals. In turning the corner, the equalizing frame assumes the position indicated by the dotted lines in Figure 1. The bar 20 slidably moves along the body portion 1 of the draft bar.

The pin 27 is slidable in the guide slot 26 of the connector 21. The rod 14 is slidable through the eyelet 13 of the clamping member 12 which is rigidly attached to the tongue 9. Consequently, the stress occasioned by the drawing of an implement, of which the tongue 9 is a part, is distributed equally among the four draft animals. The device is simple in construction and operation and thoroughly effective for the purpose intended. It can be readily applied to an agricultural implement of an ordinary construction and is designed particularly for use with gang or sulky plows.

I claim:

1. A device of the character described comprising a draft bar having a straight body portion adapted to be adjustably connected at one end with a vertical tongue, and an integral lateral extension adapted for connection with the outer end of the vertical tongue, a slide slidably mounted on said draw bar, a draft equalizing frame pivotally mounted on said slide member, and means associated with one end of said equalizing frame and said slide member for moving said slide member back and forward on said draw bar as said draft equalizer is pivoted as in turning the vehicle.

2. A device of the character described comprising a draft bar consisting of a straight body portion having an integral lateral extension, also turned laterally adjacent to its end and adapted for connection with an implement tongue, a draft-equalizing frame pivotally connected with the draft bar, and adapted for connection with harness-engaging members, a clamping member adapted to be secured to the implement tongue and provided with an eyelet, a rod pivoted at one end to the body portion of the draft bar and arranged to slide in the eyelet, and means for preventing the disengagement of the eyelet by the rod.

3. A device of the character described comprising a draft bar having a straight body portion adapted to be adjustably connected at one end with a vehicle tongue and an integral lateral extension adapted for connection at its outer end with the vehicle tongue, a draft-equalizing frame pivoted to the said extension and adapted for connection with harness-engaging means, means carried by the frame and slidably engaging the body portion of the draft bar for guiding the frame in its movement about its pivot, and means carried by the body portion for limiting the movement of the frame relative to the body portion.

4. A device of the character described comprising a draft bar having a straight body portion adapted to be adjustably connected at one end with a vehicle tongue and an integral lateral extension adapted for connection at its outer end with the vehicle tongue, a draft-equalizing frame comprising an equalizing bar pivoted adjacent to one end thereof to the said extension, an equalizing bar of greater length adapted for connection with harness-engaging means, a connector pivoted at one end to the first named equalizing bar and at its other end to the second named equalizing bar, and a second connector pivoted at one end to the second named equalizing bar adjacent to an end of the latter and having an automatically adjustable connection at its other end with the first named equalizing bar.

JOHN ROBSON.